(12) United States Patent
Apostolopoulos et al.

(10) Patent No.: US 9,854,400 B2
(45) Date of Patent: *Dec. 26, 2017

(54) AUGMENTING WI-FI LOCALIZATION WITH AUXILIARY SENSOR INFORMATION (71) Applicant: Cisco Technology, Inc., San Jose, CA (US)

(72) Inventors: John George Apostolopoulos, Palo Alto, CA (US); Wai-tian Tan, Sunnyvale, CA (US); Xiaoqing Zhu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,407

(22) Filed: Jan. 3, 2017

(65) Prior Publication Data
US 2017/0188194 A1 Jun. 29, 2017

Related U.S. Application Data (63) Continuation of application No. 14/980,316, filed on Dec. 28, 2015, now Pat. No. 9,571,980.

(51) Int. Cl.
*H04W 24/00* (2009.01)
*H04W 4/02* (2009.01)
(Continued)

(52) U.S. Cl.
CPC ........... *H04W 4/023* (2013.01); *H04W 4/025* (2013.01); *H04W 8/26* (2013.01); *H04L 61/6022* (2013.01); *H04W 84/12* (2013.01)

(58) Field of Classification Search
CPC ....... H04W 4/023; H04W 4/025; H04W 8/26; H04W 84/12; H04W 4/02; H04W 12/06;
(Continued)

(56) References Cited

U.S. PATENT DOCUMENTS 6,862,286 B1 * 3/2005 Tams ................ H04L 29/12018
370/395.32
7,624,448 B2 * 11/2009 Coffman ............... G06F 21/552
726/22
(Continued)

FOREIGN PATENT DOCUMENTS

WO        2009094690 A1     8/2009
WO   WO 2011034721 A1 *    3/2011    ......... G08B 13/2491
WO   WO 2014067586 A1 *    5/2014    ......... G08B 13/2491

*Primary Examiner* — Mahendra Patel
(74) *Attorney, Agent, or Firm* — Ronald Fernando (57) ABSTRACT In one implementation, a method of maintaining continuous identity for mobile devices includes: obtaining a first address for a first device; and obtaining, from one or more auxiliary sensors, auxiliary sensor information related to the first device. The method also includes determining whether the auxiliary sensor information matches information associated with a second address, where the second address was previously associated with the first device. The method further includes linking the first address with the second address for the first device, in order to continue tracking the first device when the second address is no longer detected, in response to determining that the auxiliary sensor information matches information associated with the second address.

20 Claims, 9 Drawing Sheets (51) Int. Cl.
*H04W 8/26* (2009.01)
*H04L 29/12* (2006.01)
*H04W 84/12* (2009.01)

(58) Field of Classification Search
CPC . H04L 61/6022; H04L 63/0861; H04L 12/26; H04L 29/08; H04L 29/12; G08B 13/2462; G08B 13/14; G06F 11/00; G06F 17/30; H04N 7/18
USPC ........... 455/456.5, 466, 412.1, 445; 370/401, 370/310.2, 331; 342/367
See application file for complete search history.

(56) References Cited

U.S. PATENT DOCUMENTS

| | | | | |
|---|---|---|---|---|
| 8,266,697 B2* | 9/2012 | Coffman | ................ | H04L 63/14 709/224 |
| 8,558,693 B2* | 10/2013 | Martin | ................ | G06Q 10/109 340/457 |
| 9,025,833 B2 | 5/2015 | Dudovich et al. | | |
| 9,082,099 B1* | 7/2015 | Kolchin | ............... | G06Q 10/083 |
| 9,418,705 B2* | 8/2016 | Kaps | ..................... | G11B 27/17 |
| 9,509,402 B2* | 11/2016 | Ryan | ................... | H04B 10/116 |
| 9,520,041 B2* | 12/2016 | Rosa | .................. | G08B 13/2491 |
| 9,680,861 B2* | 6/2017 | Ward | .................. | H04L 63/1441 |
| 9,686,291 B2* | 6/2017 | Antonakakis | ....... | H04L 61/1511 |
| 2006/0010028 A1 | 1/2006 | Sorensen | | |
| 2007/0219720 A1 | 9/2007 | Trepagnier et al. | | |
| 2009/0009478 A1 | 1/2009 | Badali et al. | | |
| 2010/0269143 A1 | 10/2010 | Rabowsky | | |
| 2010/0289644 A1* | 11/2010 | Slavin | ................ | G08B 13/2402 340/568.1 |
| 2010/0318588 A1 | 12/2010 | Buford et al. | | |
| 2011/0069173 A1 | 3/2011 | Hazzani | | |
| 2011/0169959 A1* | 7/2011 | DeAngelis | .......... | A63B 24/0021 348/157 |
| 2012/0051604 A1 | 3/2012 | Dudovich et al. | | |
| 2012/0071092 A1 | 3/2012 | Pasquero et al. | | |
| 2014/0002663 A1* | 1/2014 | Garland | .................. | H04N 7/188 348/159 |
| 2014/0007010 A1* | 1/2014 | Blom | ...................... | G06F 3/011 715/825 |
| 2016/0072802 A1 | 3/2016 | Hoyos | | |
| 2016/0073252 A1* | 3/2016 | Spencer | ............... | H04W 8/22 709/224 |
| 2016/0117458 A1* | 4/2016 | Hermans | ............ | G06F 19/3406 705/2 |
| 2016/0227360 A1* | 8/2016 | Huang | ................ | G06K 7/10366 |

* cited by examiner

| Address 401-A-1 | Characterization Information 402-A | Location Information 404-A | | |
|---|---|---|---|---|
| Address 401-B-1 | Characterization Information 402-B | Location Information 404-B | Address 401-B-2 | |
| Address 401-C-1 | Characterization Information 402-C | Location Information 404-C | Address 401-C-2 | Address 401-C-3 |
| Address 401-D-1 | Characterization Information 402-D | Location Information 404-D | | |
| ... | ... | ... | | |

Characterization Database 225

AUGMENTING WI-FI LOCALIZATION WITH AUXILIARY SENSOR INFORMATION

TECHNICAL FIELD

The present disclosure generally relates to tracking and locating mobile devices, and in particular, to systems, methods, and devices for enabling continuity of identity for mobile devices.

BACKGROUND

In general, mobile devices connect to a network (e.g., a private network or a public network such as the Internet) via a networking device (e.g., an access point, router, switch, or the like). Typically, a mobile device is identified by an address when it uses the networking capabilities of the networking device. Device addresses, in particular media access control (MAC) addresses, are often used as proxies for the physical presence of users or even the identity of users, in part due to their persistent nature.

Device addresses are the basis of many tracking algorithms that promise both enhanced analytics to operators and location-based services for users. For example, the location of a mobile device can be tracked, and distinguished from other mobile devices, according to its address.

However, in some circumstances, the address of a mobile device is randomized in an attempt to protect the privacy of the user and purposefully frustrate tracking algorithms. As such, a mobile device that was once being tracked according to one address will appear as a new mobile device to be tracked with an unrecognized address after its address is randomized.

Randomization events frustrate the ability of traditional Wi-Fi localization techniques to track mobile devices according to addresses as they are no longer persistent. Randomization events also skew analytics results based on mobile device tracking by double counting mobile devices (e.g., in crowd counting scenarios) or losing the locality of mobile devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for maintaining continuous identity for and locality of mobile devices. For example, in some implementations, a method includes: obtaining a first address for a first device; and obtaining, from one or more auxiliary sensors, auxiliary sensor information related to the first device. The method also includes determining whether the auxiliary sensor information matches information associated with a second address, where the second address was previously associated with the first device. The method further includes linking the first address with the second address for the first device, in order to continue tracking the first device when the second address is no longer detected, in response to determining that the auxiliary sensor information matches information associated with the second address.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

In general, mobile devices connect to a network (e.g., a private network or a public network such as the Internet) via a networking device (e.g., an access point, router, switch, or the like). Typically, a mobile device is identified by an address when it uses the networking capabilities of the networking device. Addresses, in particular physical addresses such as media access control (MAC) addresses, are often used as proxies for the physical presence or even identity of a person (user), in part due to their persistent nature.

However, in some circumstances, a randomization event occurs whereby the address of a mobile device that was being tracked according to its address is randomized. As such, the mobile device appears as if it is a new mobile device to be tracked. According to some implementations, the present disclosure provides a system and method for maintaining continuous identity for mobile devices based at least in part on auxiliary sensor information related to mobile devices and/or their users such as video data, proximity between devices, or persistent local connections between devices (e.g., BLUETOOTH links).

Figure 1:
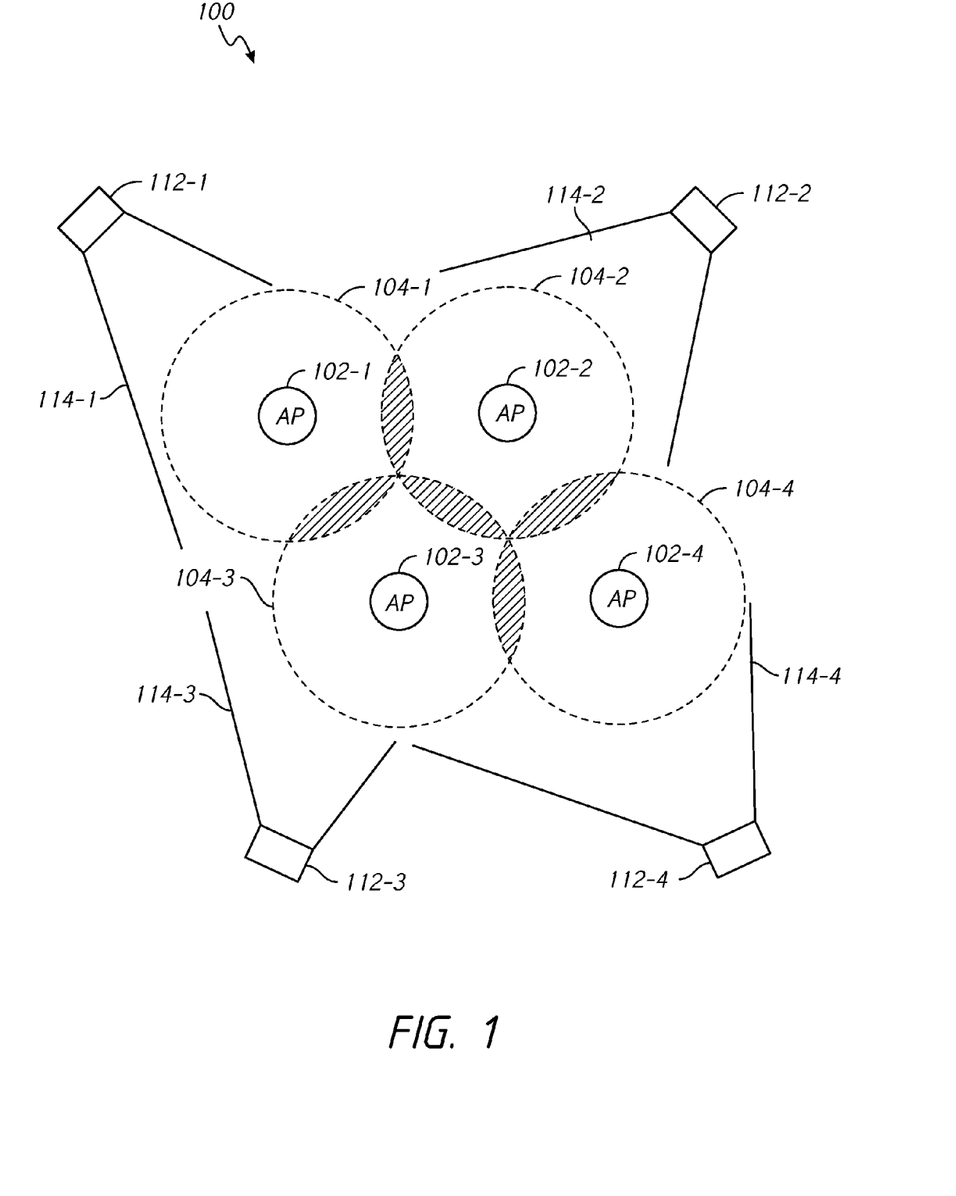
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a plurality of access points 102-1, 102-2, 102-3, and 102-4 (collectively referred to as "access points 102" herein) with coverage areas 104-1, 104-2, 104-3, and 104-4 (collectively referred to as "coverage areas 104" herein), respectively. In some implementations, the access points 102 obtain addresses (e.g., media access control (MAC) addresses) for devices within the operating environment 100. In some implementations, the access points 102 obtain characterization information (sometimes also herein called "auxiliary sensor information") related to devices within the operating environment such as whether a device has a BLUETOOTH connection to another device, an indication of the radio system (e.g., GSM or CDMA) that the device uses, the speed, acceleration, or trajectory of the device, and/or the like. In some implementations, the access points 102 monitor the locations of devices within the operating environment 100 using Wi-Fi localization techniques. Alternatively, in some implementations, the access points 102 are switches, routers, bridges, hubs, or the like.

For example, an individual with a mobile device that is located within coverage area 104-1 can access a network (e.g., a private network or a public network such as the Internet) via access point 102-1. Continuing with this example, if the individual moves into coverage area 104-2 with his/her mobile device, access is provided to the network via access point 102-2. In some implementations, a hand-off protocol exists between the access points 102 for seamless transitions between coverage areas 104 in order to ensure uninterrupted access to the network.

In some implementations, the operating environment 100 also includes a plurality of sensors 112-1, 112-2, 112-3, and 112-4 with ranges (or fields of view) 114-1, 114-2, 114-3, and 114-4, respectively. For example, the sensors 112 include video cameras, infrared (IR) cameras, spectral analyzers, microphones, temperature sensors, humidity sensors, motion sensors, and/or the like. In some implementations, the sensors 112 collect characterization information (sometimes also herein called "auxiliary sensor information") associated with individuals within the operating environment 100 such as visual signatures, facial features, heat maps, distinguishing articles of clothing, color histograms, speech patterns, gait patterns, and/or the like. In some implementations, the sensors 112 monitor and track the locations of individuals within the operating environment 100 using visual localization techniques or other similar localization techniques.

Figure 2:
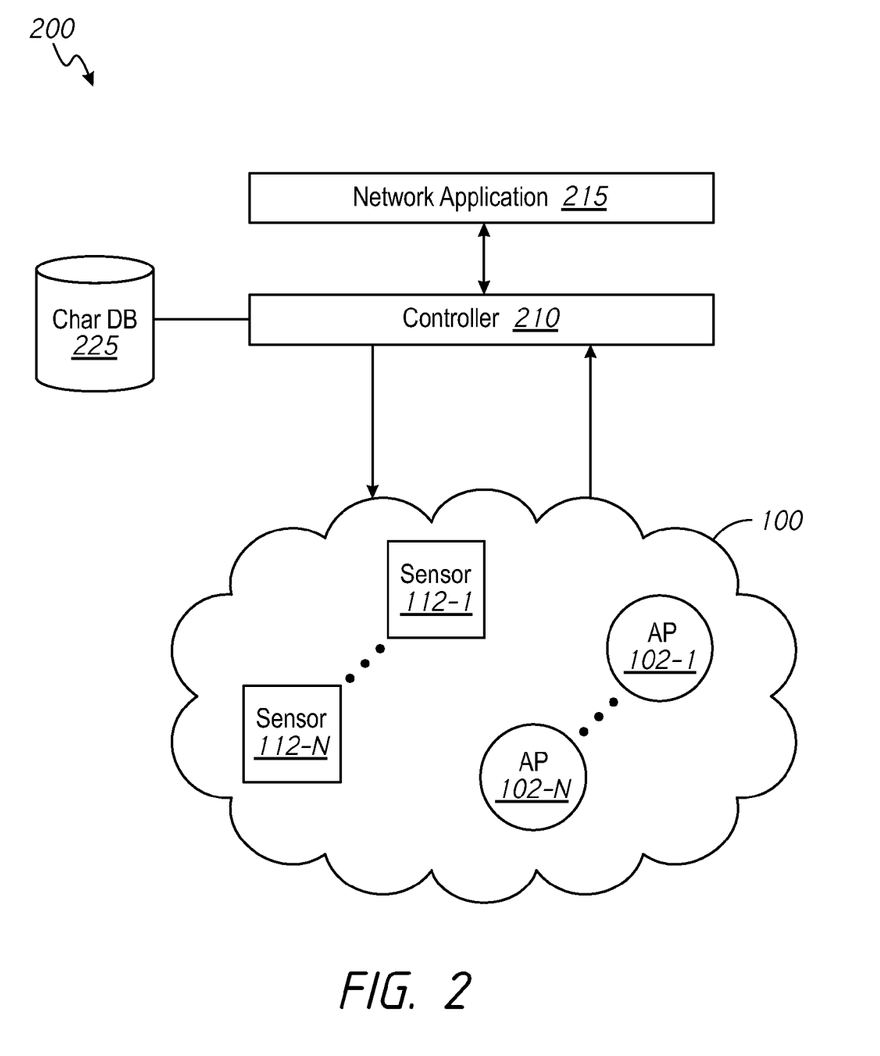
FIG. 2 is a block diagram of an example data network environment in accordance with some implementations.

FIG. 2 is a block diagram of an example data network environment 200 in accordance with some implementations. To that end, as a non-limiting example, the data network environment 200 includes a controller 210, a characterization database 225, and a network application 215. In some implementations, the network application 215 sets parameters for the controller 210. In some implementations, the network application supplies instructions to the controller 210. In some implementations, the characterization database 225 correlates multiple addresses associated with a device. In some implementations, the characterization database 225 also correlates address(es) of a device with characterization information associated with the user of the device for persistent monitoring and localization purposes. In some implementations, the characterization database 225 further includes location information regarding the device and/or the user of the device. The characterization database 225 is described in more detail herein with reference to FIG. 4.

In some implementations, the controller 210 controls and facilitates the monitoring and localizing of devices within the operating network 100. In some implementations, the controller 210 obtains addresses of devices, characterization information, and/or location information for devices within the operating network 100 from access points 102. In some implementations, the access points 102 export addresses of devices, characterization information, and/or location information for devices within the operating network 100 to the controller 210 constantly. In some implementations, the access points 102 export addresses of devices, characterization information, and/or location information for devices within the operating network 100 to the controller 210 according to a predefined schedule (e.g., every 10, 30, 60, etc. seconds). In some implementations, the controller 210 requests addresses of devices, characterization information, and/or location information for devices within the operating network 100 from the access points 102.

In some implementations, the controller 210 obtains characterization and/or location information for individuals within the operating network 100 from sensors 112. In some implementations, the sensors 112 export characterization and/or location information for individuals within the operating network 100 to the controller 210 constantly. In some implementations, the sensors 112 export characterization and/or location information for individuals within the operating network 100 to the controller 210 according to a predefined schedule (e.g., every 10, 30, 60, etc. seconds). In some implementations, the controller 210 requests physical characterization and/or location information for individuals within the operating network 100 from the sensors 112.

Figure 3:
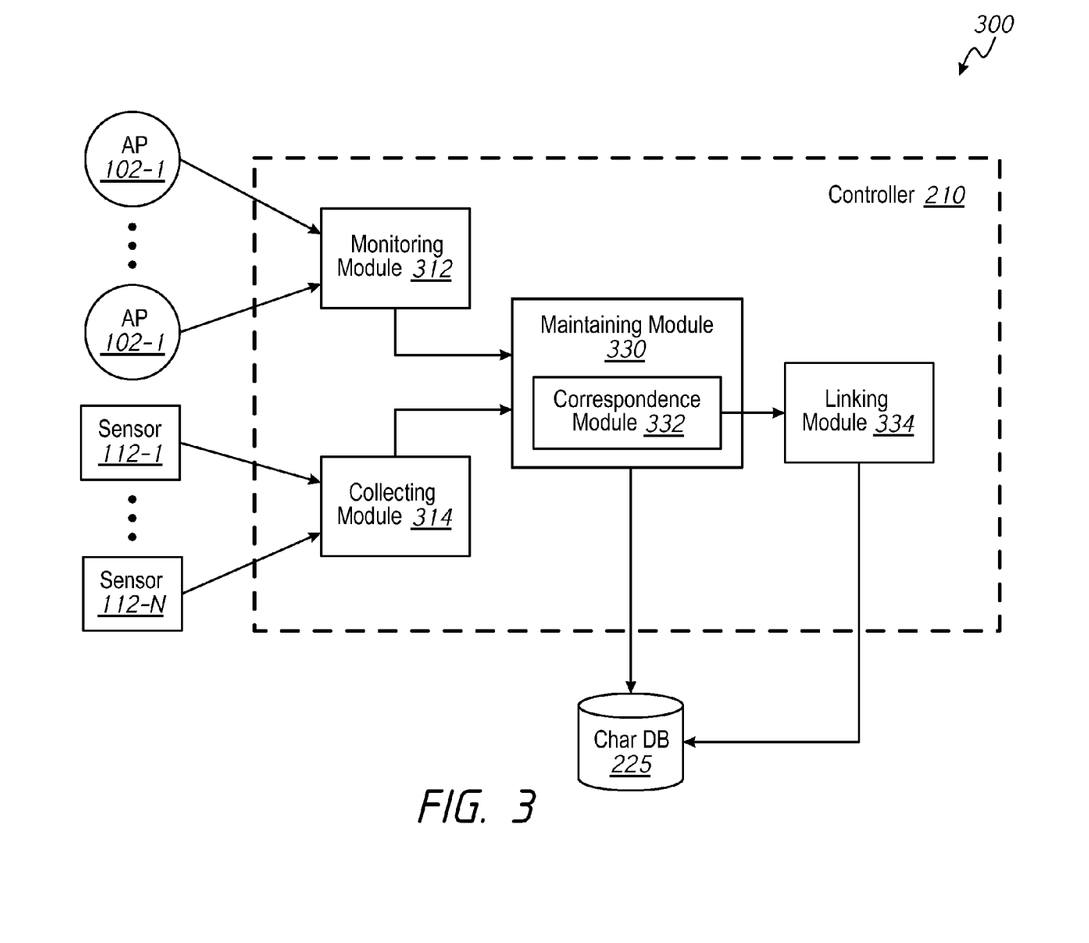
FIG. 3 is a block diagram of a data processing environment in accordance with some implementations.

FIG. 3 is a block diagram of a data processing environment 300 in accordance with some implementations. The data processing environment 300 shown in FIG. 3 is similar to and adapted from the data network environment 200 shown in FIG. 2. Elements common to FIGS. 2 and 3 include common reference numbers, and only the differences between FIGS. 2 and 3 are described herein for the sake of brevity. To that end, the data processing environment 300 includes the access points 102, the sensors 112, the controller 210, and the characterization database 225. According to some implementations, the controller 210 includes a monitoring module 312, a collecting module 314, a maintaining module 330, a correspondence module 332, and a linking module 334.

In some implementations, the monitoring module 312 obtains addresses for devices (e.g., MAC addresses), characterization information, and/or location information from the access points 102 for devices within the coverage areas of the access points 102. In some implementations, the collecting module 314 obtains characterization and/or location information from the sensors 112 for individuals within the ranges of the sensors 112.

In some implementations, the maintaining module 330 maintains the characterization database 225 based at least in part on the information obtained from the monitoring module 312 and the collecting module 314. In some implementations, the maintaining module 330 also establishes correspondence between one or more addresses for a device and characterization information for an individual. The maintaining module 330 is described in greater detail below with reference to FIGS. 4 and 8.

In some implementations, the correspondence module 332 determines whether the characterization information associated with a newly detected address for a device (e.g., the visual signature) matches characterization information associated with a previously detected address. In other words, the correspondence module 332 determines whether the newly detected address corresponds to a device that was previously being tracked under a different address or whether the newly detected address is associated with a device that was not previously being tracked. The correspondence module 332 is described in greater detail below with reference to FIGS. 5-8.

In some implementations, the linking module 334 links a first address for a device with a second address based on characterization information associated with the device from the access points 102 and/or characterization information associated with the individual who corresponds to the device from the sensors 112. The linking module 334 is described in greater detail below with reference to FIGS. 5-8.

Figure 4:
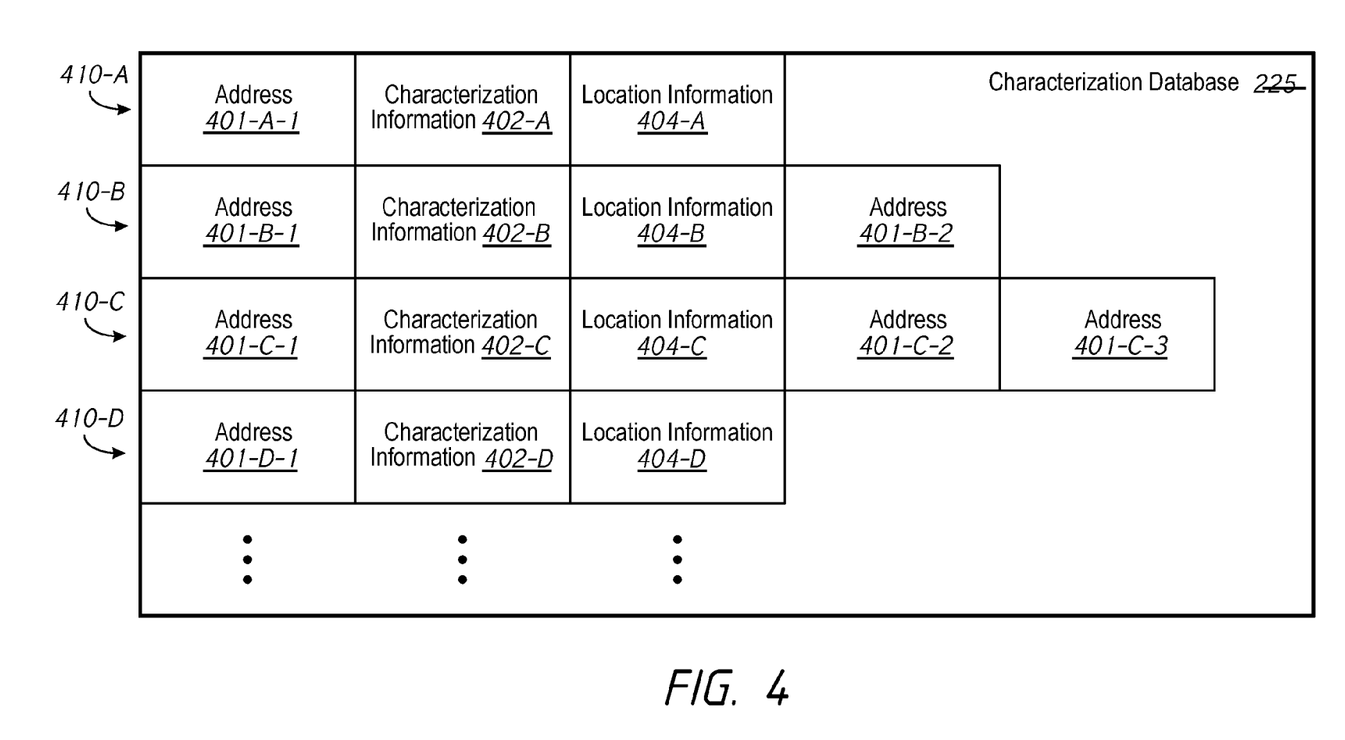
FIG. 4 is a block diagram of an example data structure for a characterization database in accordance with some implementations.

FIG. 4 is a block diagram of an example data structure for a characterization database 225 in accordance with some implementations. According to some implementations, the characterization database 225 includes a plurality of rows 410-A, 410-B, 410-C, 410-D, . . . , each of which corresponds to a unique device identified within the operating environment 100 by the controller 210. In some implementations, the characterization database 225 is populated, updated, and maintained by the controller 210 or a component thereof (e.g., the maintaining module 330 in FIG. 3).

As shown in FIG. 4, each row 410 of the characterization database 225 is characterized by the following fields: {at least one address 401, characterization information 402, and location information 404}. For example, the row 410-A is associated with the address 401-A-1 because the address for the device corresponding to the row 410-A has not been randomized.

In another example, the row 410-B is associated with addresses 401-B-1 and 401-B-2 because the device corresponding to the row 410-B was initially associated with the address 401-B-1 before time T when its address was randomized. Continuing with this example, after time T, the device corresponding to the row 410-B is associated with the address 401-B-2.

In yet another example, the row 410-C is associated with addresses 401-C-1, 401-C-2, and 401-C-3 because the device corresponding to the row 410-C was initially associated with the address 401-C-1 before time T when its address was first randomized. Continuing with this example, after time T, the device corresponding to the row 410-C was associated with the address 401-C-2 until time T+1 when its address was again randomized. Further continuing with this example, after time T+1, the device corresponding to the row 410-C is associated with the address 401-C-3.

According to some implementations, the characterization information 402-A includes information associated with the unique device that corresponds to the row 410-A such as the addresses of other devices within a predefined proximity of the unique device, an indication of the existence of a connection (e.g., via BLUETOOTH) with another device, and/or the like. According to some implementations, the characterization information 402-A includes information associated an individual who corresponds to the unique device corresponding to the row 410-A. For example, the characterization information 402-A includes a visual signature of a person who is carrying/using the unique device corresponding to the row 410-A that includes, for example, one or more facial features of the person, a distinguishing article of clothing worn by the person, a heat map of the person, a color histogram corresponding to the clothing outfit of person, a voice model of a person (e.g., pitch and speech synthesis parameters such as those use for speech/speaker recognition), and/or the like.

According to some implementations, the characterization information 402-A also includes a sequence of coordinates (and, optionally, associated timestamps) associated with past locations, and the present location, of the person associated with the unique device that corresponds to the row 410-A. For example, the person is tracked within the operating environment 100 (as shown in FIG. 100) based on video or audio data from the one or more sensors 112 using visual and/or auditory localization techniques. In some implementations, the coordinates are relative to the operating environment 100. In some implementations, the coordinates are absolute geographical coordinates. According to some implementations, the location information 404-A also includes a projected path or trajectory of the person associated with the unique device that corresponds to the row 410-A. In some implementations, the location information 404-A also includes the velocity and/or acceleration of the person associated with the unique device that corresponds to the row 410-A.

According to some implementations, the location information 404-A includes a sequence of coordinates (and, optionally, associated timestamps) associated with past locations, and the present location, of the unique device that corresponds to the row 410-A. For example, the unique device is tracked within the operating environment 100 (as shown in FIG. 100) based data from the one or more access points 102 using Wi-Fi localization techniques. In some implementations, the coordinates are relative to the operating environment 100. In some implementations, the coordinates are absolute geographical coordinates. According to some implementations, the location information 404-A also includes a projected path or trajectory of the unique device that corresponds to the row 410-A. In some implementations, the location information 404-A also includes the velocity and/or acceleration of the unique device that corresponds to the row 410-A.

Figure 8:
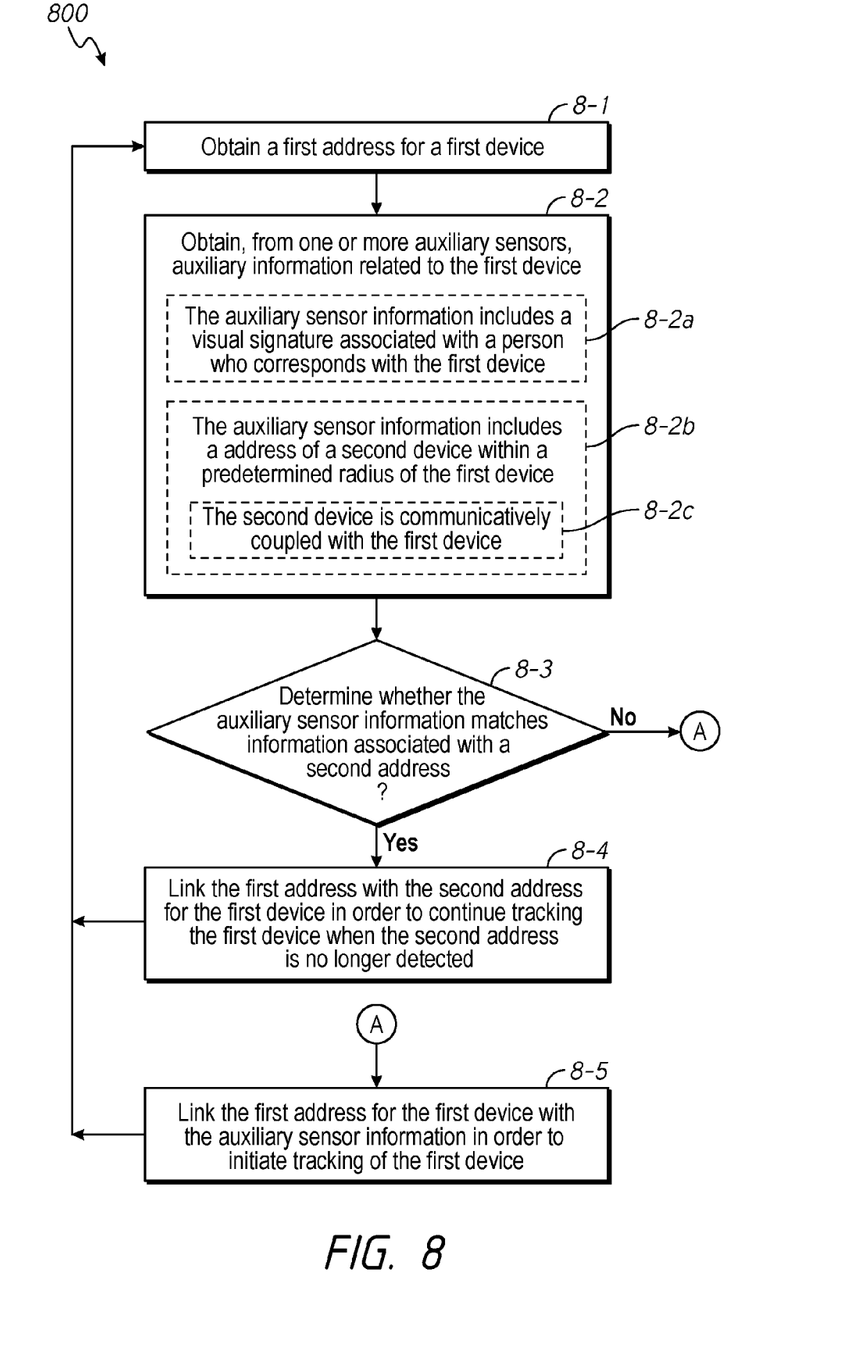
FIG. 8 is a flowchart representation of a method of maintaining continuous identity for mobile devices in accordance with some implementations.

FIG. 8 is a flowchart representation of a method 800 of maintaining continuous identity for mobile devices in accordance with some implementations. In various implementations, the method 800 is performed by a network controller (e.g., the network controller 210 in FIGS. 2 and 3). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 800 includes: obtaining a first address for a first device; obtaining, from one or more auxiliary sensors, auxiliary sensor information related to the first device; determining whether the auxiliary sensor information matches information associated with a second address, where the second address was previously associated with the first device; and linking the first address with the second address for the first device, in order to continue tracking the first device when the second address is no longer detected, in response to determining that the auxiliary sensor information matches information associated with the second address.

To that end, as represented by block 8-1, the method 800 includes obtaining a first address for a first device. In some implementations, the first device is one of a smartphone, wearable computing device, tablet, laptop, personal computer, smart home device or controller, home entertainment center, or the like. For example, with reference to FIG. 3, the controller 210 or a component thereof (e.g., the monitoring module 312 in FIG. 3) obtains (e.g., detects, requests, receives, and/or retrieves) an address (e.g., a MAC address) for a first device from the access points 102. For example, the first address has not been previously recognized. In some implementations, the first address is a media access control (MAC) address. As such, the address of the device is a proxy for the person who uses/carries the device. For example, the device is being tracked for enhanced analytics purposes and/or for location-based services.

According to some implementations, the method 800 is triggered when the controller 210 detects a new address within the operating environment 100. According to some implementations, the method 800 is triggered when the controller 210 detects the absence of a previously detected address. According to some implementations, the method 800 is triggered when the controller 210 contemporaneously (or near contemporaneously) detects the absence of a previously detected address and a new address within the operating environment 100 (e.g., a randomization event).

As represented by block 8-2, the method 800 includes obtaining, from one or more auxiliary sensors, auxiliary information related to the first device. For example, with reference to FIG. 3, the controller 210 or a component thereof (e.g., the monitoring module 312 and/or the collecting module 314 in FIG. 3) obtains auxiliary sensor information (e.g., characterization information related to the first device or an individual carrying/using the first device) from the access points 102 and/or the sensors 112.

In some implementations, the auxiliary sensor information is a visual signature associated with the person who is using or carrying the first device such as a one or more facial features, the clothing outfit of a person, a color histogram of the clothing outfit of the person, a distinguishing feature of the person, a distinguishing article of clothing worn by the person, a heat map of the person, a speech pattern of a person, a gait pattern associated with the person, and/or the like. In some implementations, the auxiliary sensor information is an address associated with another device in close proximity to the device (e.g., a second cell phone or other device that the person is carrying, a cell phone that a companion of the person is carrying, or the like). In some implementations, the auxiliary sensor information is an indication of a local connection (e.g., via BLUETOOTH) between the first device (e.g., a smartphone) and another device (e.g., a fitness band, headset, smart watch or the like).

In some implementations, the auxiliary sensor information includes at least one of a trajectory, speed, and acceleration of the first device or a person who corresponds with the first device. In some implementations, the trajectory, speed, and acceleration of the first device or the person helps to narrow down the pool of potential previously detected addresses that can be correlated with the newly detected address.

In some implementations, as represented by block 8-2a, the auxiliary sensor information includes a visual signature associated with a person who corresponds with the first device. In some implementations, the visual signature includes at least one of: a heat map, one or more facial features, one or more articles of clothing, a color histogram or a gait pattern associated with the person who corresponds with the first device, and/or the like. In some implementations, the system leverages information from a network of video cameras to develop a visual signature for the person who is carrying the device. For example, the visual identifier is originally associated with the second MAC address, but when it is randomized a new correlation between the first MAC address and the visual identifier is established.

Figure 5:
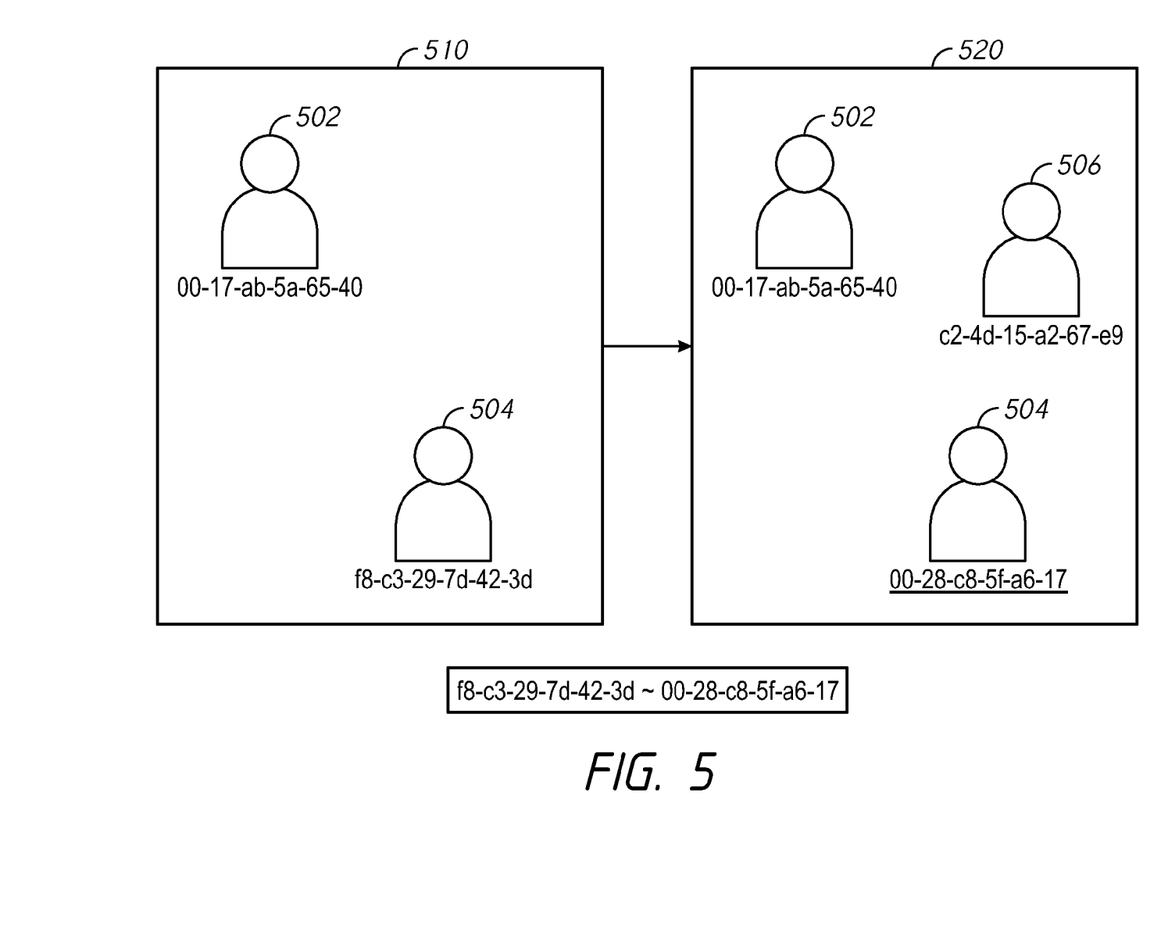
FIG. 5 is a representation of an implementation of maintaining continuous identity for mobile devices in accordance with some implementations.

As shown in FIG. 5, at time 510, a visual signature for a first person 502 corresponds to a MAC address 00-17-ab-5a-65-40 of a device that the first person 502 is using/carrying and a visual signature for a second person 504 corresponds to a MAC address f8-c3-29-7d-42-3d of a device that the second person 504 is using/carrying. For example, with reference to FIG. 4, the address 401-A-1 corresponds to the MAC address 00-17-ab-5a-65-40 of the device that the first person 502 is using/carrying at time 510 and the characterization information 402-A corresponds to the visual signature for the first person 502. Furthermore, with reference to FIG. 4, the address 401-B-1 corresponds to the MAC address f8-c3-29-7d-42-3d of device that the second person 504 is using/carrying at time 510 and the characterization information 402-B corresponds to the visual signature for the second person 504.

As shown in FIG. 5, at time 520, a visual signature for the first person 502 still corresponds to the MAC address 00-17-ab-5a-65-40 of the device that the first person 502 is using/carrying, the visual signature for the second person 504 corresponds to a newly detected MAC address 00-28-c8-5f-a6-17 of a device that the second person 504 is using/carrying, and a visual signature for a newly detected third person 506 corresponds to a newly detected MAC address c2-4d-15-a2-67-e9 of a device that the third person 506 is using/carrying. As such, a randomization event occurred with respect to the MAC address of device that the second person 504 is using/carrying. Moreover, the MAC address f8-c3-29-7d-42-3d that was detected during time 510 is linked to the MAC address 00-28-c8-5f-a6-17 because the visual signature for the second person 504 at time 510 matches the visual signature for the second person 504 at time 520.

For example, with reference to FIG. 4, the address 401-A-1 still corresponds to the MAC address 00-17-ab-5a-65-40 of the device that the first person 502 is using/carrying at time 520 and the characterization information 402-A corresponds to the visual signature for the first person 502. Furthermore, with reference to FIG. 4, the address 401-B-1 corresponds to the previously detected MAC address f8-29-7d-42-3d and the address 401-B-2 corresponds to the newly detected MAC address 00-28-c8-5f-a6-17 of device that the second person 504 is using/carrying at time 520 and the characterization information 402-B corresponds to the visual signature for the second person 504. Continuing with this example, the address 401-D-1 corresponds to the newly detected MAC address c2-4d-15-a2-67-e9 of the device that the third person 506 is using/carrying at time 520 and the characterization information 402-D corresponds to the visual signature for the third person 506.

In some implementations, as represented by block 8-2b, the auxiliary sensor information includes an address of a second device within a predetermined radius (e.g., 3, 6, etc. feet) of the first device. In some implementations, when a new address exhibits similar proximity to a group as a former address (and the former address disappears), this is strong evidence that the previously detected and newly detected addresses correspond to the same device. At the very least, leveraging the temporal correlation among a group of wireless devices (and their associated addresses) can be used to dramatically reduce the search space of candidates for the new address for a newly detected device.

Figure 6:
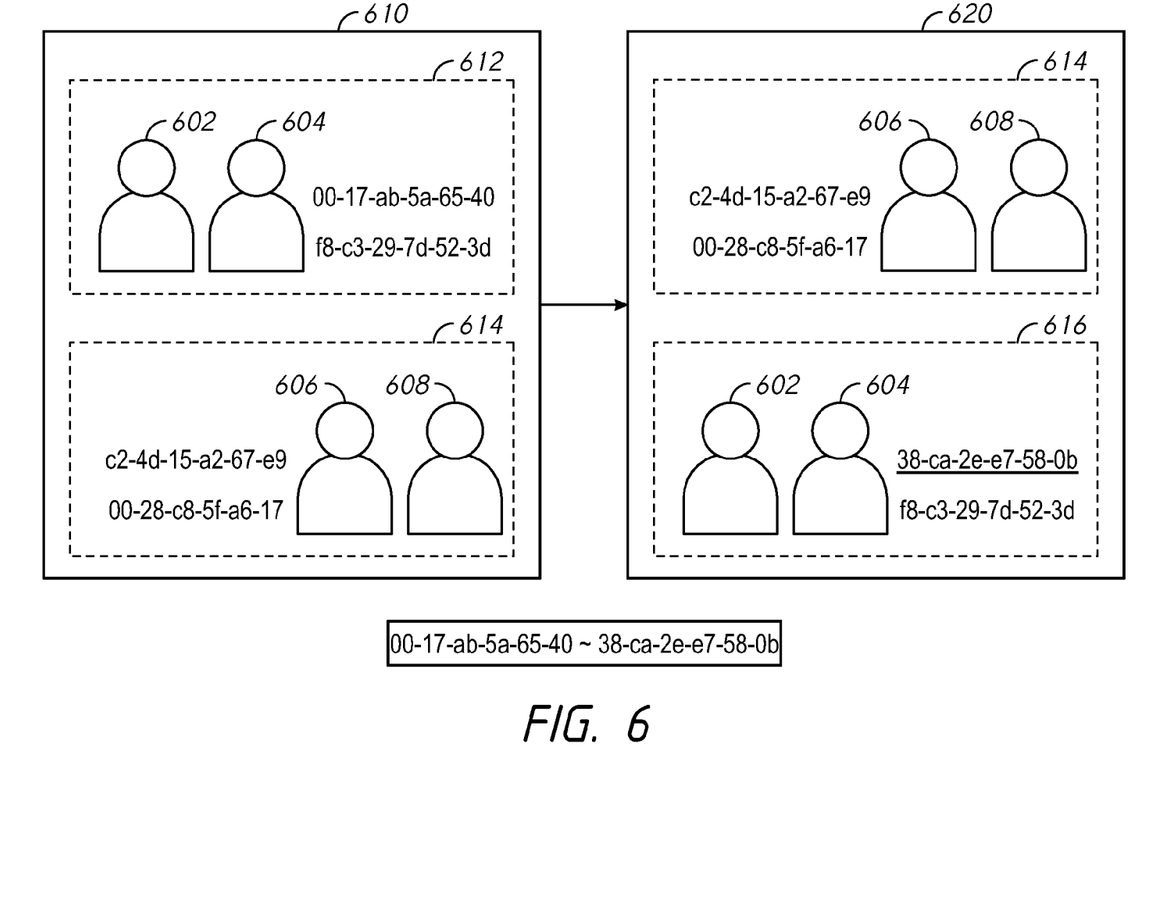
FIG. 6 is a representation of another implementation of maintaining continuous identity for mobile devices in accordance with some implementations.

As shown in FIG. 6, at time 610, a first person 602 whose device is associated with MAC address f8-29-7d-42-3d and a second person 604 whose device is associated with MAC address 00-17-ab-5a-65-40 are grouped into inter-person group 612 due to their spatial proximity to one another and in some cases their spatial proximity over time. For example, the first person 602 and the second person 604 are two friends walking close to one another. As shown in FIG. 6, at time 610, a third person 606 whose device is associated with MAC address 00-28-c8-5f-a6-17 and a fourth person 608 whose device is associated with MAC address c2-4d-15-a2-67-e9 are grouped into inter-person group 614 due to their spatial proximity to one another and in some cases their spatial proximity over time.

For example, with reference to FIG. 4, the address 401-A-1 corresponds to the MAC address f8-29-7d-42-3d of the device that the first person 602 is using/carrying at time 610 and the characterization information 402-A includes the MAC address 00-17-ab-5a-65-40 because of the proximity of the second person 604 to the first person 602. Furthermore, for example, with reference to FIG. 4, the address 401-B-1 corresponds to the MAC address 00-17-ab-5a-65-40 of device that the second person 604 is using/carrying at time 610 and the characterization information 402-B includes the MAC address f8-29-7d-42-3d because of the proximity of the first person 602 to the second person 604.

As shown in FIG. 6, at time 620, a first person 602 whose device is associated with MAC address f8-29-7d-42-3d and a second person 604 whose device is associated with newly detected MAC address 38-ca-2e-e7-58-0b are grouped into a new inter-person group 616 due to their spatial proximity to one another and in some cases their spatial proximity over time. As shown in FIG. 6, at time 620, a third person 606 whose device is associated with MAC address 00-28-c8-5f-a6-17 and a fourth person 608 whose device is associated with MAC address c2-4d-15-a2-67-e9 are still grouped into inter-person group 614 due to their spatial proximity to one another and in some cases their spatial proximity over time.

As such, a randomization event occurred with respect to the MAC address of the device that the second person 604 is using/carrying. Moreover, the MAC address 00-17-ab-5a-65-40 that was detected during time 610 is linked to the MAC address 38-ca-2e-e7-58-0b because the person who the second person 604 was grouped with at time 610 (e.g., the first person 602 associated with the MAC address f8-29-7d-42-3d) is the same as at time 620.

For example, with reference to FIG. 4, the address 401-A-1 still corresponds to the MAC address f8-29-7d-42-3d of the device that the first person 602 is using/carrying at time 620 and the characterization information 402-A includes the newly detected MAC address 38-ca-2e-e7-58-0b because of the proximity of the second person 604 to the first person 602. Furthermore, with reference to FIG. 4, the address 401-B-1 corresponds to the previously detected MAC address 00-17-ab-5a-65-40 and the address 401-B-2 corresponds to the newly detected MAC address 38-ca-2e-e7-58-0b of device that the second person 604 is using/carrying at time 620 and the characterization information 402-B includes the MAC address f8-29-7d-42-3d because of the proximity of the first person 602 to the second person 604.

In some implementations, as represented by block 8-2c, the second device is communicatively coupled with the first device. For example, the device is a phone which is connected (or paired) with the second device (e.g., a BLUETOOTH headset or a wearable computing device) via a local connection. In some implementations, a person may carry several devices that can be sensed, or one device may contain multiple radios that can be sensed. Examples include BLUETOOTH headphones or headsets and wearable computing devices such as iWATCH or ANDROID watches, which talk with iPHONES and ANDROID phones over BLUETOOTH, respectively. This group of personal devices will move together, and when a device has a change of MAC address from Y to the new MAC address Z for the device can be inferred by continued proximity to the same set of devices say with address X.

Figure 7:
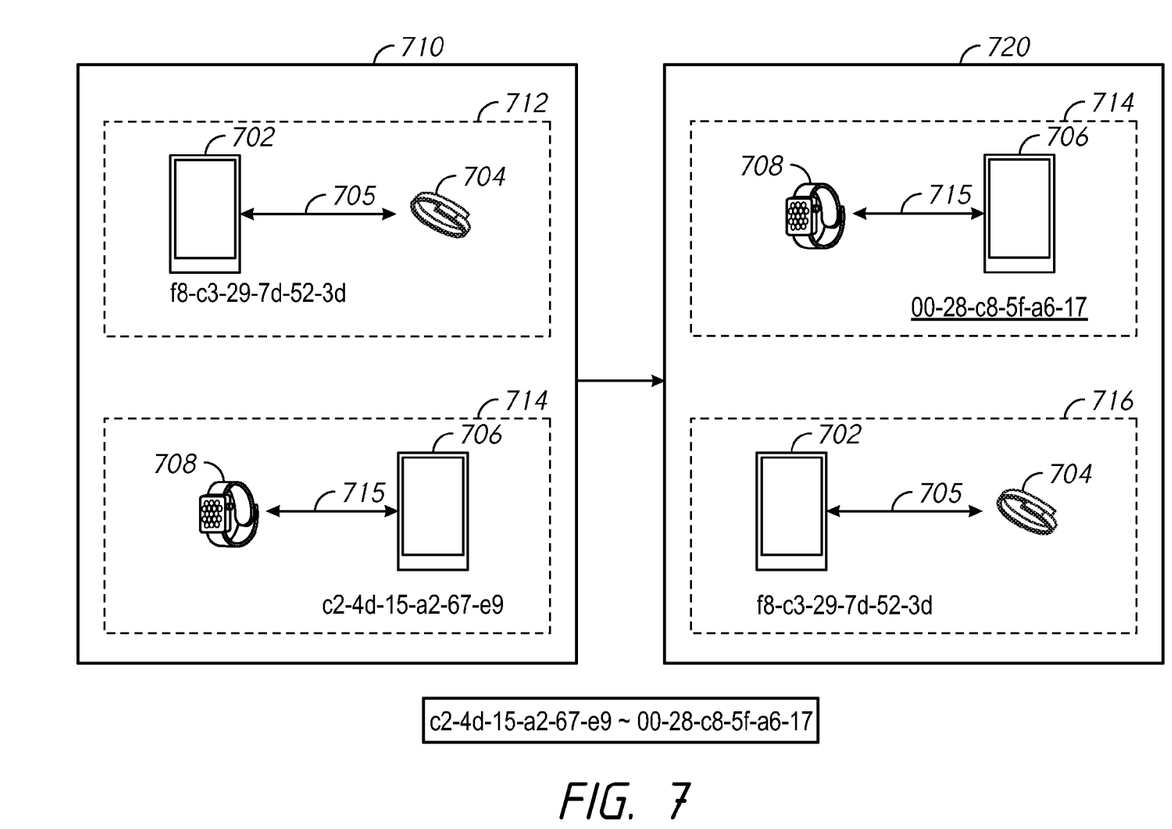
FIG. 7 is a representation of yet another implementation of maintaining continuous identity for mobile devices in accordance with some implementations.

As shown in FIG. 7, at time 710, a first device 702 (e.g., a smartphone) associated with MAC address f8-c3-29-7d-52-3d is connected (e.g., via BLUETOOTH) to a second device 704 (e.g., a wearable computing device such as a fitness band). As such, the first device 702 and the second device 704 are grouped into intra-person group 712 due to the spatial proximity and/or the local connection 705 between the first device 702 and the second device 704. For example, with reference to FIG. 4, the address 401-D-1 corresponds to the MAC address f8-c3-29-7d-52-3d of the first device 702 at time 710 and the characterization information 402-D includes an indication of the connection 705 between the first device 702 and the second device 704 and/or an address of the second device 704.

As shown in FIG. 7, at time 710, a third device 706 (e.g., a smartphone) associated with MAC address c2-4d-15-a2-67-e9 is connected (e.g., via BLUETOOTH) to a fourth device 708 (e.g., a wearable computing device such as a smart watch). As such, the third device 706 and the fourth device 708 are grouped into intra-person group 714 due to the spatial proximity and/or the local connection 715 between the third device 706 and the fourth device 708. For example, with reference to FIG. 4, the address 401-B-1 corresponds to the MAC address c2-4d-15-a2-67-e9 of the third device 706 at time 710 and the characterization information 402-B includes an indication of the connection 715 between the third device 706 and the fourth device 708 and/or an address of the fourth device 708.

As shown in FIG. 7, at time 720, the first device 702 is still connected (e.g., via BLUETOOTH) to the second device 704. As such, the first device 702 and the second device 704 are still grouped into intra-person group 712 due to the local connection 705 between the first device 702 and the second device 704. As shown in FIG. 7, at time 720, the third device 706 associated with newly detected MAC address 00-28-c8-5f-a6-17 is connected (e.g., via BLUETOOTH) to the fourth device 708. As such, the third device 706 and the fourth device 708 are grouped into a new intra-person group 716 due to the spatial proximity and/or the local connection 715 between the third device 706 and the fourth device 708.

As such, a randomization event occurred with respect to the MAC address device of third device 706. Moreover, the MAC address c2-4d-15-a2-67-e9 that was detected during time 710 is linked to the newly detected MAC address 00-28-c8-5f-a6-17 because the local connection 715 between the third device 706 and the fourth device 708 is the same at time 710 as it is at time 720. For example, with reference to FIG. 4, the address 401-B-1 corresponds to the MAC address c2-4d-15-a2-67-e9 of the third device 706 at time 710 and the address 401-B-2 corresponds to the newly detected MAC address 00-28-c8-5f-a6-17 of the third device 706 at time 720 and the characterization information 402-B includes an indication of the connection 715 between the third device 706 and the fourth device 708 and/or an address of the fourth device 708.

As represented by block 8-3, the method 800 includes determining whether the auxiliary sensor information matches information associated with a second address. For example, with reference to FIG. 3, the controller 210 or a component thereof (e.g., the correspondence module 332 in FIG. 3) determines whether the auxiliary sensor information associated with the first address for the first device (e.g., the visual signature) matches auxiliary sensor information associated with a previously detected second address. In other words, the method 800 determines whether the first address corresponds to a device that was previously being tracked under a different address (e.g., the second address) or whether the first address is associated with a device that was not previously being tracked.

In some implementations, a positive match is determined as a function of at least one threshold criteria. For example, the at least one threshold criteria is satisfied when at least a predefined percentage of features of a visual signature associated with the previously detected second address match the visual signature associated with the first address for the first device. In another example, the at least one threshold criteria is satisfied when at least a predefined number of features of a visual signature associated with the previously detected second address match the visual signature associated with the first address for the first device. In yet another example, the at least one threshold is satisfied when a second device within a predefined proximity of the first address was also within the predefined proximity of the second address. In some implementations, the predefined proximity is spatial (e.g., a 3 meter radius). In some implementations, the predefined proximity is spatial-temporal, whereby the addresses follow the same path over time or have spatial proximity over time (e.g., within 3 meters for 90 seconds). In yet another example, the at least one threshold criteria is satisfied when a same local connection between a second device and the first address also existed between the second device and the second address. In some implementations, the at least one threshold criteria is adaptive. In some implementations, the positive match is determined by comparing recent histories of auxiliary sensor information (e.g., time series of the locations of the device in the past 60 seconds) related to the first and second addresses.

In some implementations, the first address for the device is linked to the second address when a correlation score between the auxiliary sensor information related to first address and the second address satisfies a correlation confidence threshold. In some implementations, the first address for the device is not linked to the second address when a correlation score between auxiliary sensor information related to the first address and the second address does not satisfy a correlation confidence threshold. For example, if the correlation is above X % (e.g., 80% correlation), the system continues collecting auxiliary sensor information related to the device until the accuracy threshold is satisfied.

Else, in this example, the device is tracked as if it is newly discovered/tracked. In some implementations, the correlation confidence threshold is chosen based on a tradeoff between tracking and incorrect associations. For example, if it is desirable to increase the probability of tracking a user or device, a lower correlation threshold is chosen. In another example, if it is desirable to reduce the number of incorrect associations/trackings, a higher correlation threshold is chosen.

This approach is also robust against the addition of random time jitter between when the old MAC address disappears and the new one appears. Identification can be performed at a given instance of time, or improved performance can be achieved by tracking the MAC addresses and accumulating the probability distribution over a time duration of seconds to minutes. For example, the correlation confidence threshold is satisfied when the accumulated probability distribution over a predetermined time period (e.g., 5 minutes) exceeds a predefined confidence score.

If the auxiliary sensor information matches information associated with a second address, the method 800 continues to block 8-4. If the auxiliary sensor information does not match information associated with a second address, the method 800 continues to block 8-5.

As represented by block 8-4, the method 800 includes linking the first address with the second address in order to continue tracking the first device when the second address is no longer detected. For example, with reference to FIG. 3, the controller 210 or a component thereof (e.g., the linking module 334 in FIG. 3) links the first and second addresses in the characterization database 225. As such, in one example, after the MAC address for the device is randomized, the auxiliary sensor information indicates that the first MAC address is correlated with a previously identified second MAC address in order to continue tracking the device/person.

In some implementations, with reference to FIG. 4, rows 410 of the characterization database 225 associated with each of the first and second addresses are linked (e.g., with pointers or the like). In some implementations, with reference to FIG. 4, the previous address for the first device is overwritten with the newly detected address in the row 410 of the characterization database 225 associated with the first device. In some implementations, with reference to FIG. 4, the first and second addresses are both included in a row 410 of the characterization database 225 associated with the first device (e.g., the addresses 401-B-1 and 401-B-2 in row 410-B).

As represented by block 8-5, the method 800 includes linking the first address with the second address in order to initiate tracking of the first device. For example, with reference to FIG. 3, the controller 210 or a component thereof (e.g., the maintaining module 330 in FIG. 3) creates an entry in the characterization database 225 that correlates the first address with the auxiliary sensor information. For example, if the device is turned on for the first time in view of the system, the method 800 associates the auxiliary sensor information with the first MAC address in case it is later randomized.

After blocks 8-4 and 8-5, the method 800 continues to block 8-1. For example, with reference to FIG. 3, the controller 210 or a component thereof (e.g., the monitoring module 312 and/or the maintaining module 330 in FIG. 3) monitors the addresses obtained from the access points 102 for a newly detected address.

Figure 9:
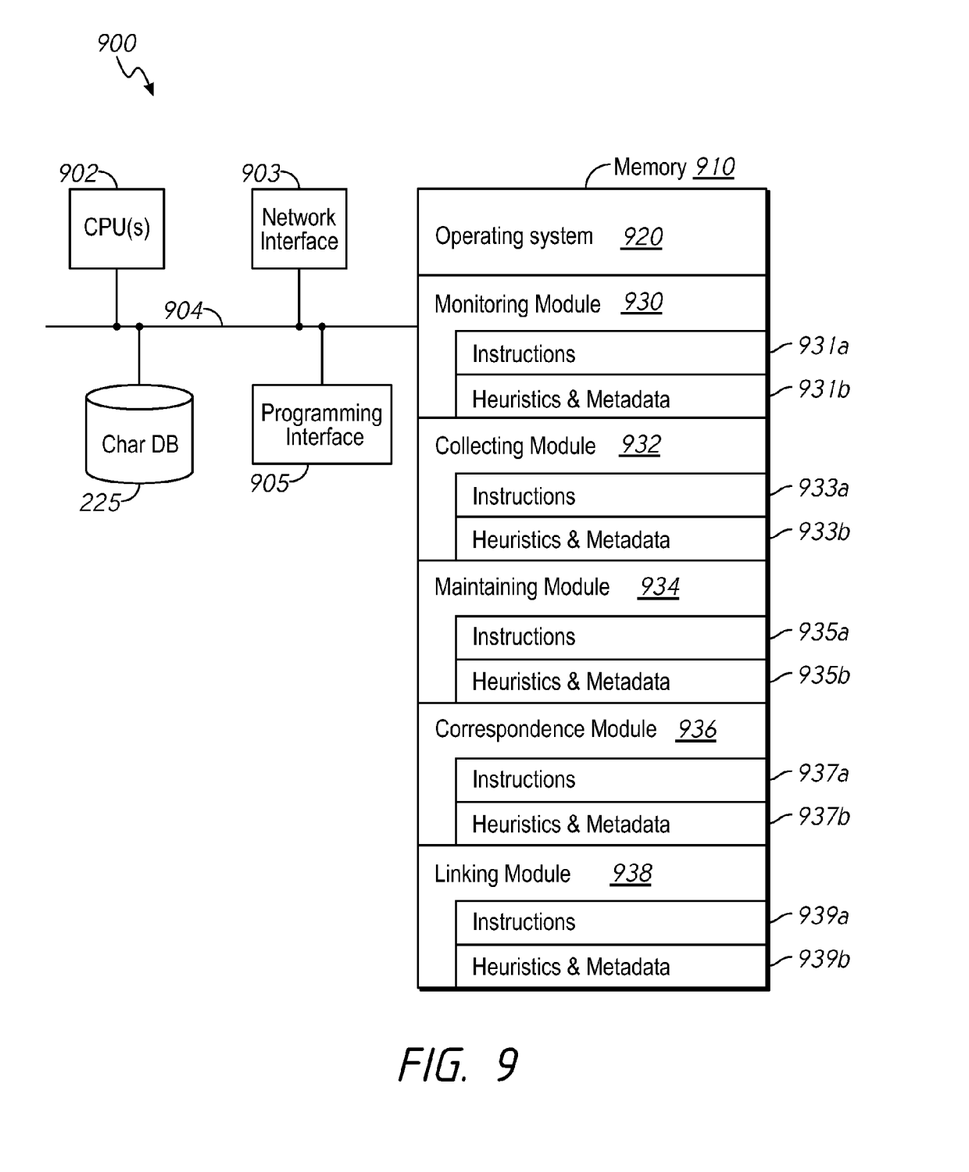
FIG. 9 is a block diagram of an example device in accordance with some implementations.

FIG. 9 is a block diagram of an example of a device 900 in accordance with some implementations. For example, in some implementations, the device 900 is similar to and adapted from the network controller 210 in FIGS. 2 and 3. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units (CPUs) 902, a network interface 903, a programming (I/O) interface 905, a memory 910, a characterization database 225, and one or more communication buses 904 for interconnecting these and various other components.

In some implementations, the one or more communication buses 904 include circuitry that interconnects and controls communications between system components. The characterization database 225 stores a plurality of rows each of which corresponds to a unique device identified within the operating environment. In some implementations, each row of the characterization database 225 is characterized by following fields: {at least one address, characterization information, and location information}. The characterization database 225 is described in more detail above with reference to FIG. 4.

The memory 910 includes high-speed random access memory, such as DRAM, SRAM, DDR RAM, or other random access solid state memory devices. In some implementations, the memory 910 includes non-volatile memory, such as one or more magnetic disk storage devices, optical disk storage devices, flash memory devices, or other non-volatile solid state storage devices. The memory 910 optionally includes one or more storage devices remotely located from the one or more CPUs 902. The memory 910 comprises a non-transitory computer readable storage medium. In some implementations, the memory 910 or the non-transitory computer readable storage medium of the memory 910 stores the following programs, modules and data structures, or a subset thereof including an optional operating system 920, a monitoring module 930, a collecting module 932, a maintaining module 934, a correspondence module 936, and a linking module 938.

The operating system 920 includes procedures for handling various basic system services and for performing hardware dependent tasks.

In some implementations, the monitoring module 930 is configured to obtain addresses, characterization information, and/or location information from networking devices (e.g., the access points 102 in FIG. 1) for devices (e.g., smartphone, wearable computing device, tablet, laptop, personal computer, smart home device or controller, home entertainment center, or the like) within the coverage areas of the networking devices. To that end, in various implementations, the monitoring module 930 includes instructions and/or logic 931*a*, and heuristics and metadata 931*b*. According to some implementations, the monitoring module 930 is similar to and adapted from the monitoring module 312 in FIG. 3.

In some implementations, the collecting module 932 is configured to obtain characterization and/or location information from auxiliary sensors (e.g., the sensors 112 in FIG. 1) for individuals within the ranges of the auxiliary sensors. To that end, in various implementations, the collecting module 932 includes instructions and/or logic 933*a*, and heuristics and metadata 933*b*. According to some implementations, the collecting module 932 is similar to and adapted from the collecting module 314 in FIG. 3.

In some implementations, the maintaining module 934 is configured to maintain characterization database 225 based at least in part on the information obtained from the monitoring module 930 and/or the collecting module 932. To that end, in various implementations, the maintaining module 934 includes instructions and/or logic 935*a*, and heuristics and metadata 935*b*. According to some implementations, the maintaining module 934 is similar to and adapted from the maintaining module 330 in FIG. 3.

In some implementations, the correspondence module 936 is configured to determine whether the characterization information associated with a newly detected address for a device (e.g., the visual signature) matches characterization information associated with a previously detected address. To that end, in various implementations, the correspondence module 936 includes instructions and/or logic 937*a*, and heuristics and metadata 937*b*. According to some implementations, the correspondence module 936 is similar to and adapted from the correspondence module 332 in FIG. 3.

In some implementations, the linking module 938 is configured to link first address for a device with a second address within the characterization database 225 based on characterization information associated with the device and/or characterization information associated with the individual who corresponds to the device. To that end, in various implementations, the linking module 938 includes instructions and/or logic 939*a*, and heuristics and metadata 939*b*. According to some implementations, the linking module 938 is similar to and adapted from the linking module 334 in FIG. 3.

Although the monitoring module 930, the collecting module 932, the maintaining module 934, the correspondence module 936, and the linking module 938 are shown as residing on a single device (i.e., the device 900), it should be understood that in other implementations, any combination of the monitoring module 930, the collecting module 932, the maintaining module 934, the correspondence module 936, and the linking module 938 reside in separate computing devices. For example, each of the monitoring module 930, the collecting module 932, the maintaining module 934, the correspondence module 936, and the linking module 938 reside on a separate device.

Moreover, FIG. 9 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first sensor could be termed a second sensor, and, similarly, a second sensor could be termed a first sensor, which changing the meaning of the description, so long as all occurrences of the "first sensor" are renamed consistently and all occurrences of the "second sensor" are renamed consistently. The first sensor and the second sensor are both sensors, but they are not the same sensor.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a controller including one or more processors and non-transitory memory:
detecting a first address associated with a first device at a first time, wherein the first device is characterized by first characterization information;
tracking the first device based on the first address;
ceasing to detect the first address and detecting a second address associated with a second device at a second time, wherein ceasing to detect the first address includes detecting a potential randomization event and ceasing to track the first device, and wherein the second device is characterized by second characterization information; and
associating the second address with the first address to continue tracking the first device in response to determining that that the second characterization information associated with the second device matches the first characterization information associated with the first device within a threshold tolerance.

2. The method of claim 1, further comprising tracking the second device based on the second address in response to determining that that the second characterization information associated with the second device does not match the first characterization information associated with the first device within the threshold tolerance.

3. The method of claim 1, wherein detecting the first address includes detecting a first network connection between the first device and one of a plurality of access points based on the first address associated with the first device, and
wherein detecting the second address includes detecting a second network connection between the second device and one of the plurality of access points based on the second address associated with the second device.

4. The method of claim 1, wherein associating the second address with the first address includes determining that the first and second devices correspond to a same device.

5. The method of claim 1, wherein associating the second address with the first address includes determining that the second address is a randomized version of the first address.

6. The method of claim 1, wherein the threshold tolerance is a function of at least one threshold criteria.

7. The method of claim 6, wherein threshold criteria is satisfied when a predefined percentage of features associated with the second characterization information match features associated with the first characterization information.

8. The method of claim 1, wherein the first characterization information includes at least one of a visual signature, trajectory, speed, or acceleration of a person associated with the first device.

9. The method of claim 1, wherein the first characterization information includes an address of a third device within a predetermined radius of the first device.

10. The method of claim 9, wherein the third device is communicatively coupled to the first device.

11. A non-transitory memory storing one or more programs, which, when executed by one or more processors of a controller, cause the controller to:
detect a first address associated with a first device at a first time, wherein the first device is characterized by first characterization information;
track the first device based on the first address;
cease to detect the first address and detect a second address associated with a second device at a second time, wherein ceasing to detect the first address includes detecting a potential randomization event and ceasing to track the first device, and wherein the second device is characterized by second characterization information; and
associate the second address with the first address to continue tracking the first device in response to determining that that the second characterization information associated with the second device matches the first characterization information associated with the first device within a threshold tolerance.

12. The non-transitory memory of claim 11, wherein the one or more programs further cause the controller to track the second device based on the second address in response to determining that that the second characterization information associated with the second device does not match the first characterization information associated with the first device within the threshold tolerance.

13. The non-transitory memory of claim 11, wherein detecting the first address includes detecting a first network connection between the first device and one of a plurality of access points based on the first address associated with the first device, and
wherein detecting the second address includes detecting a second network connection between the second device and one of the plurality of access points based on the second address associated with the second device.

14. The non-transitory memory of claim 11, wherein associating the second address with the first address includes determining that the first and second devices correspond to a same device.

15. The non-transitory memory of claim 11, wherein associating the second address with the first address includes determining that the second address is a randomized version of the first address.

16. A controller comprising:
one or more processors;
a non-transitory memory; and
one or more programs, the one or more programs are stored in the non-transitory memory and configured to be executed by the one or more processors, and the one or more programs include instructions for causing the controller to:
detect a first address associated with a first device at a first time, wherein the first device is characterized by first characterization information;
track the first device based on the first address;
cease to detect the first address and detect a second address associated with a second device at a second time, wherein ceasing to detect the first address includes detecting a potential randomization event and ceasing to track the first device, and wherein the second device is characterized by second characterization information; and
associate the second address with the first address to continue tracking the first device in response to determining that that the second characterization information associated with the second device matches the first characterization information associated with the first device within a threshold tolerance.

17. The controller of claim 16, wherein the one or more programs further include instructions for causing the controller to track the second device based on the second address in response to determining that that the second characterization information associated with the second device does not match the first characterization information associated with the first device within the threshold tolerance.

18. The controller of claim 16, wherein associating the second address with the first address includes determining that the first and second devices correspond to a same device.

19. The controller of claim 16, wherein associating the second address with the first address includes determining that the second address is a randomized version of the first address.

20. The method of claim 1, wherein the first and second addresses corresponds to media access control (MAC) addresses.

* * * * *

UNITED STATES PATENT AND TRADEMARK OFFICE
CERTIFICATE OF CORRECTION

PATENT NO. : 9,854,400 B2
APPLICATION NO. : 15/397407
DATED : December 26, 2017
INVENTOR(S) : John George Apostolopoulos et al.

It is certified that error appears in the above-identified patent and that said Letters Patent is hereby corrected as shown below:

In the Specification

In Column 8, Line 60, please amend as shown:
corresponds to the previously detected MAC address f8-c3-29

In Column 9, Line 17, please amend as shown:
device is associated with MAC address f8-c3-29-7d-42-3d and In Column 9, Line 31, please amend as shown:
A-1 corresponds to the MAC address f8-c3-29-7d-42-3d of the In Column 9, Line 40, please amend as shown:
includes the MAC address f8-c3-29-7d-42-3d because of the In Column 9, Line 43, please amend as shown:
device is associated with MAC address f8-c3-29-7d-42-3d and In Column 9, Line 61, please amend as shown:
f8-c3-29-7d-42-3d) is the same as at time 620.

In Column 9, Line 63, please amend as shown:
A-1 still corresponds to the MAC address f8-c3-29-7d-42-3d In Column 10, Line 7, please amend as shown:
includes the MAC address f8-c3-29-7d-42-3d because of the Signed and Sealed this
Twenty-second Day of December, 2020

Andrei Iancu
*Director of the United States Patent and Trademark Office*